United States Patent [19]

Argiro

[11] Patent Number: 4,466,799
[45] Date of Patent: Aug. 21, 1984

[54] CUBOID BLOCK, INSTRUCTIONAL DEVICE FOR MULTIPLICATION TABLES

[76] Inventor: Jason Argiro, Rd. 1, Box 367, Highland, N.Y. 12528

[21] Appl. No.: 455,966

[22] Filed: Jan. 6, 1983

[51] Int. Cl.³ .......................... G09B 1/00; G09B 19/02
[52] U.S. Cl. ................................. 434/203; 434/208; 434/209; 434/403
[58] Field of Search ................ 434/203, 208, 209, 403

[56] References Cited

U.S. PATENT DOCUMENTS 2,063,287 12/1936 Aikins ................................. 434/203
3,628,261 12/1971 Thompson ........................... 434/208
3,999,310 12/1976 Lufkin et al. ................... 434/209 X

FOREIGN PATENT DOCUMENTS 179113 7/1954 Austria ................................. 434/203

Primary Examiner—William H. Grieb
Attorney, Agent, or Firm—Bielen & Peterson

[57] ABSTRACT

An instructional toy device for multiplication computation formed by a string of cuboid blocks having an interconnecting elastic string permitting equal segments of multiple blocks to be folded in a back and forth arrangement of aligned rows, the blocks each being individually marked with a number progressing in an ordinary arithmetic series of increasing units from an end block marked 1 to an end block marked with the number of the total blocks in the string, a multiplication computation being represented by a selected number equalling the number of blocks in a segment and a multiple equalling the number of rows, the product of which is the numerical marking of the last block in the segment of the last row.

7 Claims, 4 Drawing Figures

U.S. Patent     Aug. 21, 1984     4,466,799
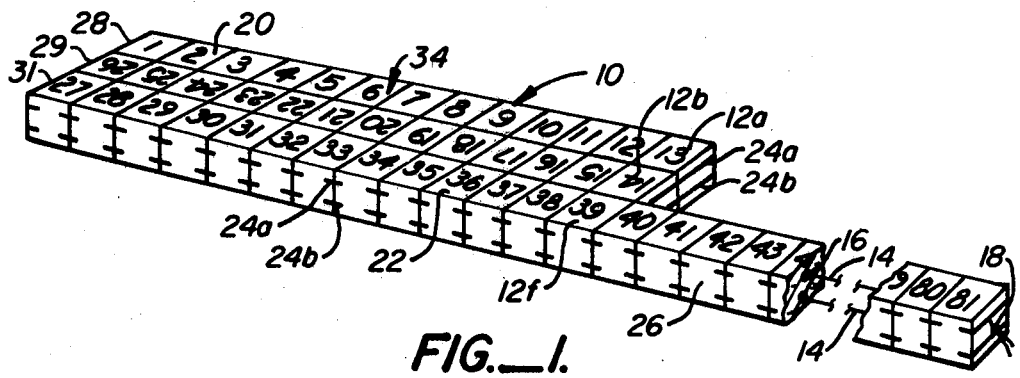
FIG._1.
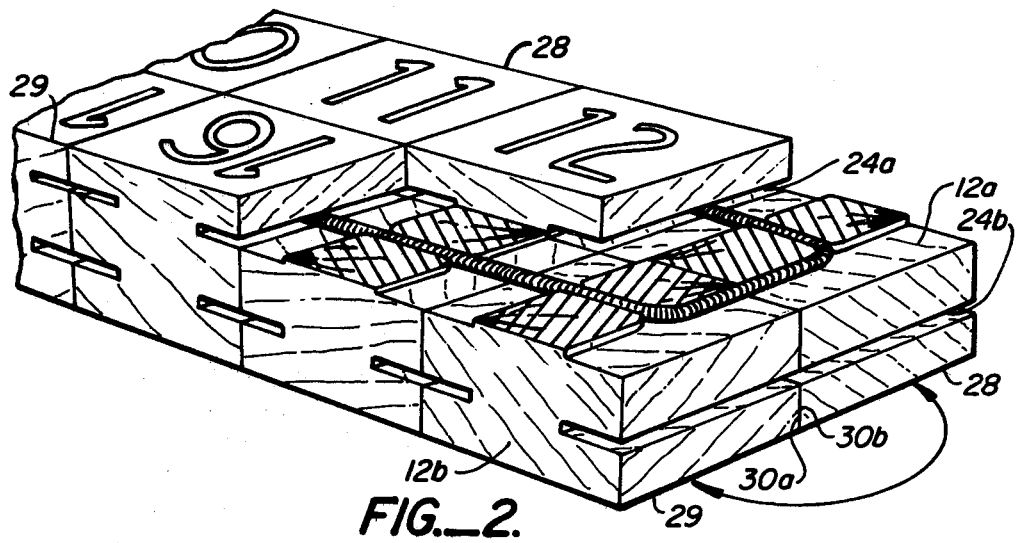
FIG._2.
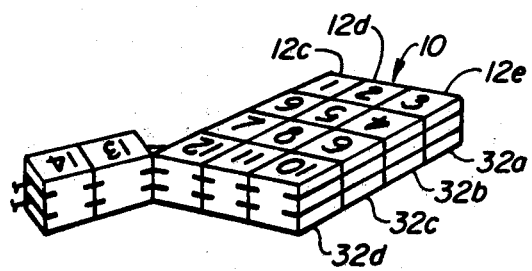
FIG._3.
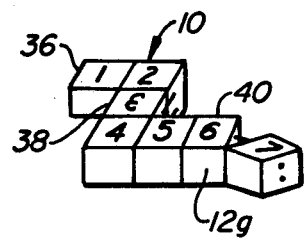
FIG._4.

CUBOID BLOCK, INSTRUCTIONAL DEVICE FOR MULTIPLICATION TABLES

BACKGROUND OF THE INVENTION

This invention relates to an instructional device for multiplication computations to assist the early education of a child in a demonstrable manner. Modern educational techniques have increasingly focused on teaching children mathematical concepts by demonstration rather than rote memory. When a child is able to understand basic concepts particularly by discovery with tangible tools, a foundation is established for subsequent understanding of more complex operations necessary for solving more difficult problems. In learning multiplication operations, an accepted method of introducing a young child to the concept of multiplication is to teach them to understand that a first number times another second number can be represented by a number of groups of tangible objects. For example 3×4 can represent three groups of four objects. The child can then set up a real solution to this problem by arranging three groups of four objects and counting the total number of objects represented. While actual loose objects such as blocks are helpful the task of solving a problem such as 9×8 can try the patience of a child and result in frustrations detrimental to a discovery learning process.

Developing a means of relating the concept of multiplication with tangible experience is more in conformity with prior learning experiences, for example, the child's grasp of language through the relationship of early vocabulary with things or actions. The more sophisticated grasp of language fundamentals is an outgrowth of the child's early language experience. Almost intuitively the child discovers the order amidst the sounds of speech. From a phoneme base the child can construct complex formulations of words, phrases and sentences.

Although the basics of arithmetic are conceptually defined in tangible form for addition and substruction the process becomes more vague when multiplication is described. After, resort to forced repetition is the result of inadequate tools to conceptually demonstrate the process of multiplication.

The common dictionary definition of multiplication is: a mathematical operation that at its simplest is an abbreviated process of adding an integer to itself a specified number of times and that is extended to other numbers in accordance with laws that are valid for integers. Yet, in teaching this operation, the common definition is customerily lost or ignored and a child may never precisely understand what multiplication is. In some cases this mystification can affect the child's entire attitude toward mathematics.

In order to couple the discovery process with a teaching process that demonstrates the definitional concepts of multiplication, the cube string provides a tangible educational device that can be physically manipulated by the child to demonstrate the principles of multiplication. The child learns by active discovery and by familiarization, from a repetative demonstrative process rather than rote process. While competition is not encouraged, manual dexterity as well as mental adroitness aids in arriving at the answer to a problem. Memory recall of the solution then becomes a natural developmental outgrowth of the experience and understanding achieved from the tangible method of problem solving.

The numeric cube string is a single structure of interconnected components that eliminates the problems of multipiece sets of cards or blocks, which become incomplete on the loss of one or more units. The device is inexpensive and subject to reasonably rough handling. Once defined as a mathematical calculator and as an educational tool the device should provide effective service for minimal cost.

SUMMARY OF THE INVENTION

The instructional toy device of this invention is an educational tool for teaching basic concepts of multiplication. The toy device comprises a numeric cube string constructed of a linear series of interconnected blocks marked with an ordinary arithmetic series of numbers, preferably eighty-one blocks numbered from one to eighty-one. A numeric cube string of this size can provide multiplication tables conventionally committed to memory. The numeric cube string has the numbers marked on at least one exposed surface and is interconnected to orient the cubes with the number surfaces on a common place. The means for interconnecting the blocks is such that the string of blocks can be folded at any position along the string, and the segment folded can be arranged alongside the remaining segment with the blocks aligned. The interconnection means allows this folding process to be repeated in a back and forth manner as many times as desired to accomplish the mathematical computation.

The operation of multiplication is performed by selecting a first number to be multiplied, which is represented by the actual number of blocks from the number one end block; and selecting a second number that is the multiplier, which is represented by the number of rows of back and forth segments of blocks. When the blocks are aligned such that an equal number of blocks are arranged in each row, except the last row which includes an extending string of the remaining blocks, the product of the multiplication is represented by the block in the last row at the end of the segment length.

For example to solve the problem 3×4, the child understands that four is added to itself three times. The child counts out four blocks from the end or directly selects the block marked "4". The child then recognizes this number as a segment of four blocks to be added to itself three times. This is accomplished demonstratively by folding the cube string after the fourth block for another segment of four blocks and folding the cube string after the eighth block for a third segment of four blocks. The last block in the third, four block segment is easily located if the segments are properly aligned in even rows. This block is directly below the end block of the two segments in the above rows.

The advantage of using the cube string is that each block represents a tangible unit that can be counted. A number four for multiplication is represented by a block marked "4", which is also found by counting out four blocks from a starting end of the cube string. A multiplier of three is represented by three rows of four blocks. The product of 3×4 is represented by the last block in the four block segment of the last row. The product is visually apparent and can be obtained by counting the blocks, as well as by identifying the "12" marked on the located block.

In this manner the child is given a clear concept of numbers and the units represented thereby. The child can visualize first hand eighty-one blocks and can demonstrate that the entire string of eighty-one blocks can be represented by nine rows of nine blocks, i.e. the product of nine times nine.

Although primarily designed for multiplication, the numeric block string can be used to demonstrate problems of addition. This is particularly helpful for the instructor to teaching the transition from addition to multiplication. For example, the problem 2+3+4 can be solved by a two block first row, a fold, a three block, second row, a fold and a four block third row with a partial fold to clearly identify the sum as the last block in the series. The sum can be identified by counting the blocks or recognizing the numeric marketing "9" of the last block.

The problem 3×4 can be demonstrated to be a short hand representation of 4+4+4 using the block string as the block arrangement and solution are the same.

These and other advantages are apparent in a detailed consideration of the preferred embodiment.

BRIEF DESCRIPTION OF THE DRAWINGS

FIG. 1 is a perspective view of the block string of this invention.

FIG. 2 is an enlarged view, partially in cross section of a portion of the block string of FIG. 1.

FIG. 3 is a perspective view of a representative block arrangement for solution of a multiplication problem.

FIG. 4 is a perspective view of a representative block arrangement for solution of an addition problem.

DETAILED DESCRIPTION OF THE PREFERRED EMBODIMENTS

Referring to FIG. 1 the cuboid blocks string is shown in perspective and designated generally by the reference numerical 10. The cuboid block string 10 in the preferred embodiment comprises a series of individual cubic blocks 12 strung on a pair of elastic strings 14. The two elastic strings are threaded through two spaced paralled holes 16 in each block. The elastic strings are tied together in a knot 18 at each end under moderate tension such that the blocks are inhibited from twisting along the length of the strings. In this manner the blocks can assume a flexible rod like configuration of square cross-section.

Along at least one of the coplaner faces of the blocks on the string are numeric markings 20 in an ordinary arithmetic series of consecutive integers from one to eighty one. The plane of the numerically marked faces is perpendicular to the plane of the two parallel strings to enable the blocks to be folded at any point along the strings between adjacent blocks such that the numerically marked faces remain visible.

In FIG. 1, the block string 10 is folded twice, once between blocks "13" and "14" and once between blocks "26" and "27". This flexibility, provided by the articulated connection of adjacent blocks, allows a back and forth, or zig-zag arrangement of blocks to be formed in neatly aligned rows of select size with a common top face 22 of numerically marked blocks. The numerical markings, however, are inverted every other row resulting from a 180° direction reversal at each fold.

To preserve an arrangement in a manipulated position, the blocks each have upper and lower slots 24a and 24b on conjunctive faces of adjacent blocks. The slots 24a and 24b are spaced to intersect the spaced holes. The slots 24a and 24b which are visible on the side faces 26 of the blocks in FIG. 1, are shown in detail in the enlayed, partial cross-sectional view of FIG. 2. The block string 14, as demonstrated by string 14a, slips into the slots 24a and 24b or the inside of the fold. The tension of the string as it makes its 180° reversal in direction retains the end block 12a of the first row 28 and end block 12b of the second row 29 in mutual restrained alignment. The side faces of one row are positioned in conjunction with the side faces of the next adjacent row. The leverage obtained by the tension of the elastic string displaced from the pivotol corner edges 30a and 30b of end blocks 12a and 12b by the string traversing slots 24a and 24b clamps the end blocks, and hence the rows 28 and 29, together.

The articulated connection between adjacent blocks can be accomplished by other means, for example by a double hinge between adjacent blocks. The elastic string and slotted block arrangement however, is preferred as more durable, inexpensive and easily repairable than other equivalent interconnection arrangements. The pair of elastic strings being displaced through spaced holes and intersecting slots on end folds prevents twisting of individual block and retains the marked top faces 22 in a common plane.

In operation, the cuboid block string is designed to demonstrate multiplication computation in a definitional manner. Although, a child would initially be preoccupied with multiplication computations within the basic multiplication table ranging from 1×1 to 9×9, a limited range of higher calculations is permissible using the basic eighty one blocks.

The arrangement of FIG. 1 is presented to show a representative number of the preferred eighty-one blocks and to illustrate that certain calculations in addition to the basic table can be performed using the cuboid block string. FIG. 3 shows a small number of the blocks to illustrate a conventional beginners calculation.

In FIG. 3, the problem 4×3 comprises a multiplicand "3" and a multiplier "4". The multiplicand "3" is represented by counting three blocks 12c,d,e from the beginning block 12a on the block string 10. The multiplier "4" is represented by the formation of four rows 32a,b,c,d of equal three block segments. By a back and forth folding, four equal rows of three block segments are aligned in the fashion shown. The product "12" simply comprises the last block in the three block segment of the fourth row. For clarity a portion of the remaining string is shown partially folded to clearly identify the last block in the three block segment. The product can be obtained by counting the blocks, or where the blocks are numerically marked, as shown, by visually identifying the number of the last block.

In FIG. 1, the problem 3×13 is represented by a thirteen block segment 34, multiplicand and a three row multiplier 28,29,31 providing a product thirtynine, which is the numerically marked block 12f completing the thirteen block segment of the third row. The remaining blocks in the strings simply extend in a straight line in conformity with the usual manner of use of the cuboid block string.

The cuboid block string of this invention comprises a useful instructional tool for tangible demonstration of the underlying concepts involved in simple integer multiplication. The cuboid block string can be used in a secondary fashion for simple addition problem as well. For example in FIG. 4, the problem 2+1+3 can be demonstratively performed by a two block first row 36, a fold, a one block second row 38, a second fold and a three block third row 40, and a partial fold, the total "6" being numerically marked on the last block 12g of the third row 10.

While the foregoing embodiments of the present invention have been set forth in considerable detail for the purposes of making a complete disclosure of the invention it may be apparent to those of skill in the art that numerous changes may be made in such detail without departing from the spirit and principles of the invention.

I claim:

1. A mathematical instruction device comprising:

a cuboid block string having a plurality of equal sized cuboid blocks with at least one exposed face having a numerical marking wherein said blocks are oriented on said string with said numerically marked faces in a common plane; and, an articulated interconnection means interconnecting adjacent blocks in said string for select folding of predefined segments of consecutive blocks into multiples of uniformly aligned, conjunctive rows; and, wherein successive blocks in said string have said numerical markings progressing in an increasing consecutive arithmetical series from a first end block marked one, to a second end block marked with a numerical marking equal to the total number of blocks in the string; and, wherein for mathematical computations, said block string is folded at select points between adjacent blocks into multiple, uniformly aligned, conjunctive rows of preselected block segments commencing from said first end block in a continuous numerical series to a block at the end of a last segment, with said marked faces in a common plane, the numerical marking of the end block of the last segment being the solution to the mathmatical computation.

2. The device of claim 1 wherein said interconnection means includes means for maintaining the orientation of said marked faces with numerical markings in the common plane.

3. The device of claim 2, wherein said blocks on said string have interfacing faces between adjacent blocks with first and second spaced holes in said interfacing faces through said blocks, said interconnection means comprising first and second elastic strings through said holes, wherein said strings are attached to said end blocks in tension and are arranged in parallel with the plane of said parallel strings perpendicular to the plane of said marked faces.

4. The device of claim 3 wherein said interconnection means comprises further, first and second slots in said interfacing faces of said blocks intersecting said first and second holes, respectively, said slots being oriented parallel to said plane of said marked faces, wherein on folding of said block string between adjacent blocks, said elastic strings enter said slots and retain said block string in a folded condition.

5. The device of claim 1 wherein on folding of segments of blocks into uniformly aligned conjunctive rows, said interconnection means includes means for maintaining said segments to folded, uniformly aligned rows.

6. The device of claim 5 wherein said interconnection means comprises a pair of elastic strings, and said means for maintaining said segments into folded rows comprises slots in said blocks into which said elastic strings are displaced on folding.

7. The device of claim 1 wherein for multiplication computation said block string is folded into rows of equal block segments, said multiplicand being equal to the number of blocks in a segment, the multiplier being equal to the number of rows and the product being equal to the marking of the last block of the last segment.

* * * * *